United States Patent [19]
Shafer

[11] Patent Number: 5,404,980
[45] Date of Patent: Apr. 11, 1995

[54] ELECTROMAGNETIC CLUTCH WITH FAILURE PROTECTION APPARATUS

[75] Inventor: Kevin W. Shafer, Dearborn Heights, Mich.

[73] Assignee: Ford Motor Company, Dearborn, Mich.

[21] Appl. No.: 225,678

[22] Filed: Apr. 11, 1994

[51] Int. Cl.$^6$ ............................................. F16D 27/10
[52] U.S. Cl. ................... 192/84 C; 192/82 T; 192/109 R
[58] Field of Search ............... 192/84 C, 82 T, 30 W, 192/84 A, 84 B, 109 R

[56] References Cited

U.S. PATENT DOCUMENTS

| 4,799,578 | 1/1989 | Matsushita . |
| 4,896,756 | 1/1990 | Matsushita . |

FOREIGN PATENT DOCUMENTS

| 55-100430 | 7/1980 | Japan | 192/84 C |
| 59-13137 | 1/1984 | Japan | 192/84 C |
| 1-210626 | 8/1989 | Japan | 192/84 C |

Primary Examiner—Andrea L. Pitts
Attorney, Agent, or Firm—Donald A. Wilkinson; Roger L. May

[57] ABSTRACT

A clutch for an automobile vehicle air conditioning compressor (8) adapted to be driven by a vehicle engine crankshaft through a drive rotor (52). The drive rotor includes an end plate (50) having a friction surface (48) adjacent to and spaced from a corresponding friction surface (46) of an armature plate (38). The armature plate (38) is mounted to and biased toward a clutch hub backplate (30) by leaf springs (34), with meltable stoppers (36) limiting movement in the biased direction. The rotor end plate (50) and the armature plate (38) include a plurality of sets of banana slots (44 and 54) for directing a magnetic flux path (78) emanating from a coil assembly (60) mounted within the rotor (52). Segments of low curie point material (76) are strategically placed along the flux path (78) and significantly increase in reluctance above a predetermined temperature in order to prevent damage to the clutch and compressor during a clutch slip condition.

16 Claims, 2 Drawing Sheets

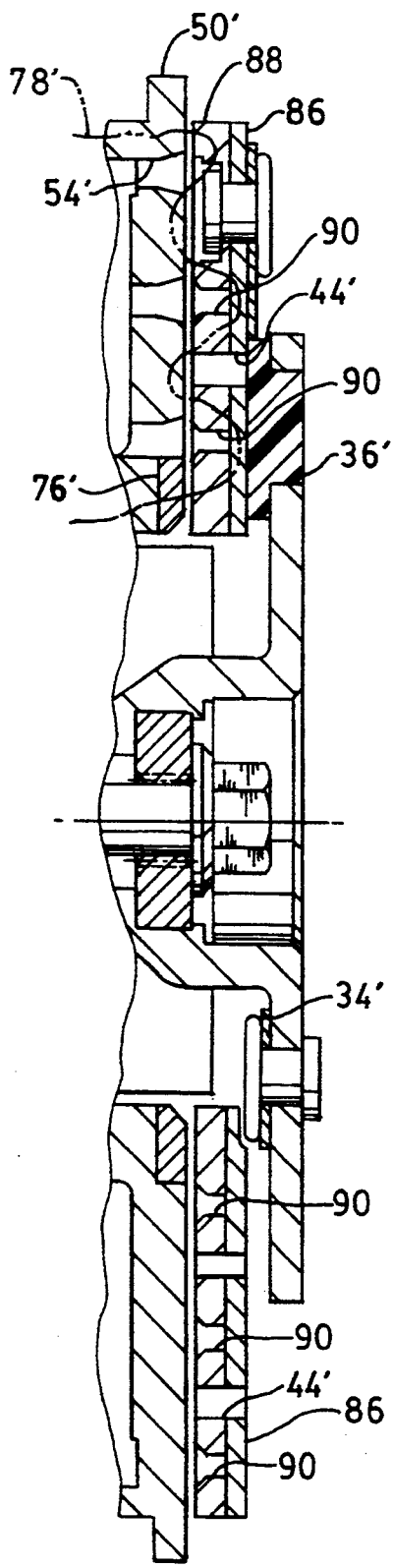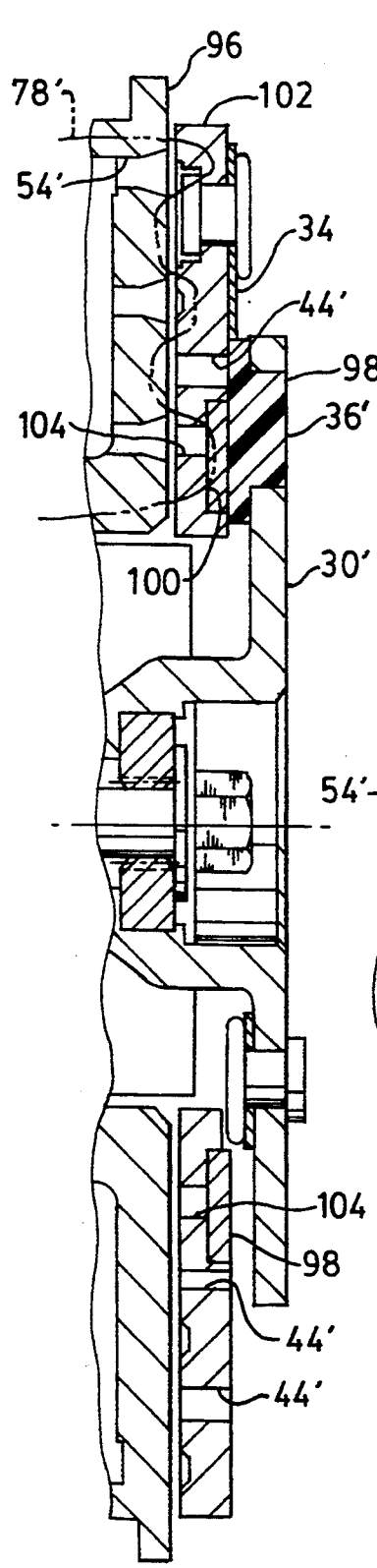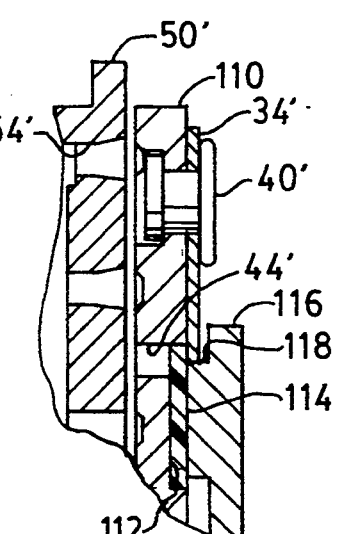

ELECTROMAGNETIC CLUTCH WITH FAILURE PROTECTION APPARATUS

FIELD OF THE INVENTION

The present invention relates generally to refrigerant compressors for use in automotive vehicle air conditioning systems and to improvements in an electromagnetic clutch assembly for establishing and disestablishing torque delivery from a vehicle engine to a driveshaft for the compressor.

BACKGROUND OF THE INVENTION

In typical electromagnetic clutches used for automotive type air conditioning compressors, a rotor or pulley is driven by a belt that encircles a drive pulley connected to the engine crankshaft. An electromagnetic clutch is usually mounted within the rotor, and the interior of the rotor acts as a core for a clutch coil assembly. A clutch armature plate is resiliently connected for axial shifting movement on the compressor driveshaft and has a friction surface in close proximity to a clutch end plate fixed to the rotor.

When the coil is energized, the clutch engages, and the armature plate is brought into frictional driving engagement with respect to the rotor so that rotor torque can be distributed to the compressor driveshaft. When the coil is de-energized, the clutch disengages, and the armature plate, along with the compressor driveshaft to which it is connected, are deactivated and remain stationary while the rotor continues to be continuously driven by the engine crankshaft whether the clutch is engaged or disengaged.

Since the rotor is continuously driven, if something happens in the air conditioning compressor that prevents the compressor driveshaft from rotating while the clutch is engaged, the clutch faces will slip past one another at high speeds. This causes a tremendous amount of heat to be generated. The heat, in turn, can cause serious damage to the clutch, the compressor and the drive belt. It is desirable, then, to prevent the generation of heat sufficient to cause serious damage until the overall unit can be serviced.

A mechanism that attempts to address this concern is disclosed in U.S. Pat. No. 4,896,756 to Matsushita. In the '756 patent, a compressor clutch has an armature plate made entirely of a low curie point material. A low curie point material is a magnetic temperature compensation material that has generally low magnetic reluctance, but becomes highly reluctant at temperatures above the material's curie point. The object of using this material is that when the material becomes highly reluctant above the curie point, this reduces the attraction force between the armature plate and a first rotatable member, thus reducing the clutch strength at the high temperatures. In this way, when a condition of slip between the clutch faces causes the temperature to rise above a certain temperature, the low attraction force reduces heat generation, thus avoiding extremely high heat conditions sufficient to damage the compressor and/or clutch.

The '756 patent further discloses meltable elements that are mounted within recesses of the annular armature plate and have protrusions disposed between the armature plate and a hub that determine the maximum amount of air gap between a first rotatable member and an armature plate. The meltable elements are designed to begin melting at about the curie temperature. So when the temperature is raised due to frictional heat from slippage, the meltable elements melt and when the clutch disengages, allow the air gap to increase to the point that the clutch cannot be re-engaged.

While this design attempts to solve the heat problem associated with clutch slippage, there are several drawbacks to this design. The entire armature plate is made of low curie point material. This is not necessary in order for low curie point material to be effective in reducing magnetic attraction. Rather than making the entire armature plate with low curie point material, the clutch armature plate or rotor need only be made with small segments of the special low curie point material strategically placed within the clutch magnetic flux path. This can be as small as one percent of the magnetic flux path being made of the low curie point material. If strategically placed, the small amount is as effective as a much larger portion of the clutch being made of low curie point material. The clutch flux path is the path that the magnetic field follows when the coil is energized. The rest of the rotor and armature plate can be made with conventional low cost low carbon steel, which has good wear characteristics.

The flux density along the flux path is greatest at certain points. Thus, the slippage protection can be accomplished with only one small segment of low curie point material strategically placed to increase the reluctance along the flux path at these points rather than making the entire clutch plate out of the special material.

Further, if the entire armature plate is made with low curie point material, then friction wear is a concern. Possible wear out of material is a higher risk since low curie point material is generally a much smoother material than conventional low carbon steel, which reduces good wear characteristics. Also, by strategically placing the low curie point material adjacent to the friction plate contact surfaces, but not contacting as a friction surface, the risk of exceeding the curie temperature during normal cycling of a healthy compressor is reduced.

Additionally, the '756 patent uses the low curie point material only on the armature plate. Yet, the pulley tends to heat more rapidly than the armature plate during clutch slippage. Therefore, there will be a better response to slippage in some instances if a portion of the pulley is made of the low curie point material.

SUMMARY OF THE INVENTION

In its embodiments the present invention contemplates an electromagnetic clutch for use in a vehicle compressor. The clutch comprises a rotor having an annular end portion made of a magnetic type material and adapted to be mounted rotatably relative to the compressor, with the end portion having a first annular friction surface and including a portion of the diameter of the annular end portion being made of a low curie point material. A hub is adapted to be affixed to a drive shaft, and an armature plate of magnetic type material is resiliently connected and biased toward the hub, allowing for limited axial movement toward the annular end portion of the rotor. The armature plate includes a second friction surface facing and directly adjacent to the first friction surface forming an air gap in between the two friction surfaces. A coil assembly is mounted within the rotor having means for selectively creating a magnetic field to magnetically attract the armature plate toward the annular end portion of the rotor such that the first and second frictional surfaces engage one another wherein an increase in temperature of the low curie point segment beyond a predetermined temperature will cause an increase in reluctance of the material sufficient to reduce the magnetic attractive force between the rotor and the armature plate and thereby disengage the first and second friction surfaces.

Accordingly, it is an object of the present invention to provide an electromagnetic clutch for a vehicle compressor that employs segments of strategically placed low curie point material in order to short the magnetic flux path when the material heats up to a predetermined temperature due to clutch slippage.

It is an advantage of the present invention that the strategically placed segment of low curie point material will quickly respond to protect the clutch and compressor from permanent heat damage due to a clutch slip condition while the compressor is in operation.

It is a further advantage of the present invention that a clutch is provided that is low cost, easy to maintain, reliable, and has good wear characteristics along the clutch faces by minimizing direct frictional contact of low curie point material along the clutch faces.

BRIEF DESCRIPTION OF THE DRAWINGS

FIG. 2 is a view similar to FIG. 1 illustrating a first alternate embodiment;

FIG. 3 is a view similar to FIG. 1 illustrating a second alternate embodiment; and FIG. 4 is a view taken from the encircled area 4 in FIG. 1 showing a third alternate embodiment.

DETAILED DESCRIPTION OF THE PREFERRED EMBODIMENTS

Figure 1:
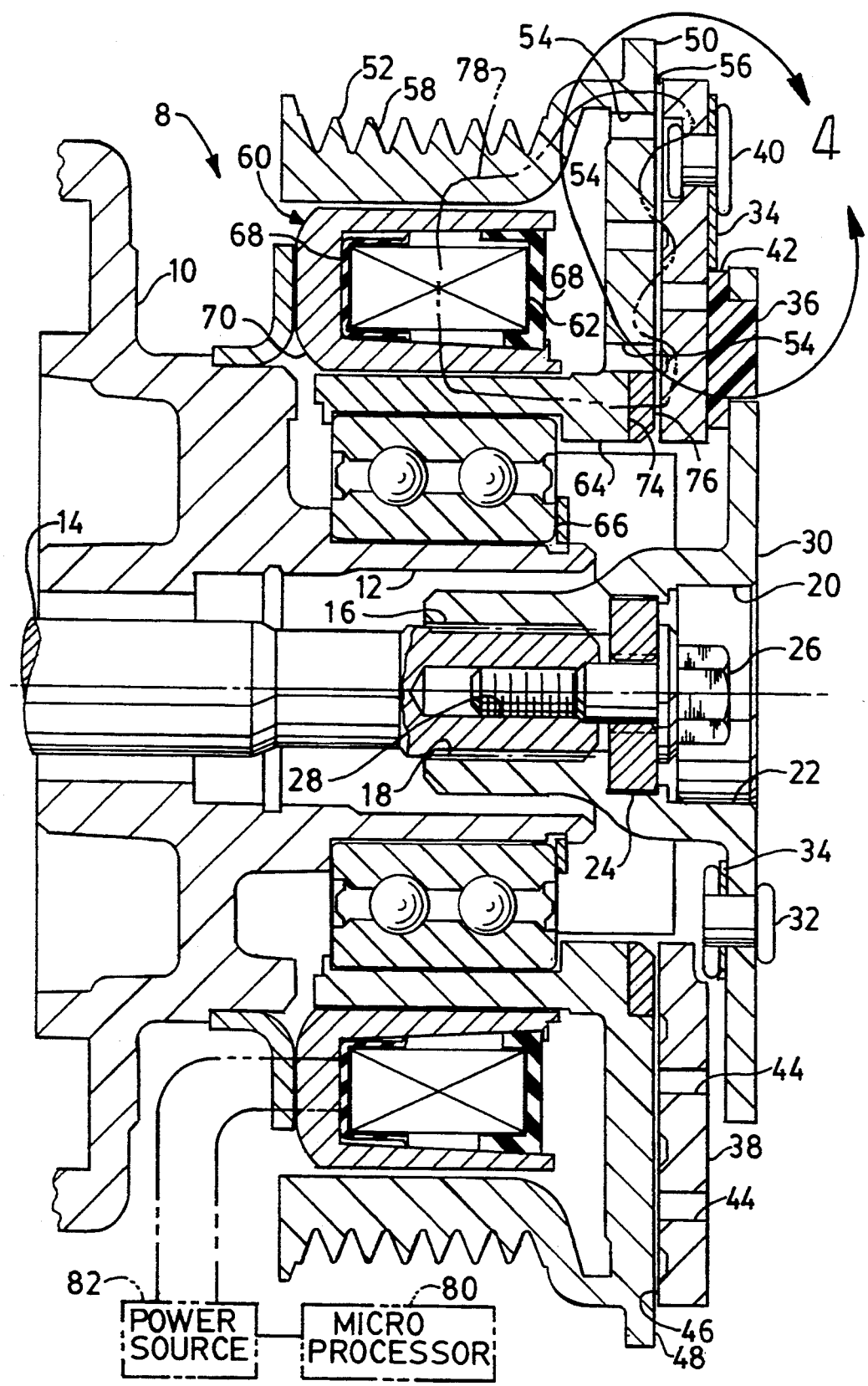
FIG. 1 is a cross-sectional view of an electromagnetic clutch affixed to a compressor.

FIG. 1 shows a portion of a compressor 8 having a housing 10 with a generally cylindrical shape. Housing 10 includes a fixed sleeve 12 forming a cylindrical opening for receiving a compressor drive shaft 14. Drive shaft 14 is provided with external threads 16 for threadably engaging internal threads 18 of a clutch hub 20. Clutch hub 20 is provided with a bore 22 through its center in order to receive a spacer washer 24 and a retainer bolt 26 that threads into internal threads 28 in drive shaft 14. Drive shaft 14 and hub 20 are fixed both axially and rotatably relative to one another.

Hub 20 includes an annular backplate portion 30. Rivets 32 retain first ends of resilient leaf springs 34 in backplate portion 30. Backplate portion 30 also includes bores therethrough for receiving rubber or plastic stoppers 36. A low carbon steel annular armature plate 38 is fixed to the second ends of leaf springs 34 by rivets 40 such that leaf springs 34 bias armature plate 38 toward backplate 30. With this type of design, compressor driveshaft 14 is coupled drivably to the armature plate 38 through a drive spring type of arrangement.

Stoppers 36 each include a spacer portion 42 that protrudes from backplate 30 and is sandwiched between backplate 30 and armature plate 38. The thickness of spacer portion 42, then, determines the minimum distance between backplate 30 and armature plate 38.

Armature plate 38 includes two sets of concentric banana slots 44 therethrough running circumferentially about it. Banana slots 44 are formed with a high reluctance material such as air, stainless steel, or plastic. One surface of armature plate 38 forms a frictional clutch surface 46.

Spaced directly adjacent to frictional surface 46 of armature plate 38 and forming a gap 56 between the two surfaces is a frictional clutch surface 48. Frictional clutch surface 48 is a surface of an end plate portion 50 of a low carbon steel pulley or rotor 52. The thickness of gap 56 is controlled by spacer washer 24 and retainer bolt 26. Three sets of concentric banana slots 54 are provided in end plate 50 radially such that banana slots 54 in end plate 50 are alternately located radially relative to banana slots 44 in armature plate 38. That is, one banana slot 54 in end plate 50 is located radially inward of one banana slot 44 in armature plate 38, a second banana slot 54 in end plate 50 is located radially between banana slots 44 in armature plate 38 and a third banana slot 54 is located radially outside of banana slots 44.

Rotor 52 also includes a belt engagement portion 58. Its diameter can be chosen to satisfy the particular requirements for compressor 8 as compressor 8 is matched to an engine having a particular speed/torque characteristic. A belt, not shown, engages belt engagement portion 58 and also engages a rotary member, also not shown, that is typically coupled to an engine crankshaft and other accessories.

Rotor 52 encloses and is spaced directly adjacent to a fixed electromagnetic coil assembly 60, which surrounds and is directly adjacent to a rotor hub portion 64 of rotor 52. Rotor hub 64 is affixed to a bearing assembly 66, which is in turn affixed to the outer circumference of fixed sleeve 12 of housing 10. This arrangement allows rotor 52 to freely rotate about fixed sleeve 12 when driven by a belt coupled to an engine crankshaft.

Coil assembly 60 includes coil windings 62 supported by plastic coil caps 68, and enclosed within a generally U-shaped low carbon steel coil housing 70. Coil windings 62 are connected to a power source 82, as shown schematically in FIG. 1.

When coil windings 62 are energized, a magnetic flux path 78, shown generally in phantom, is created that attracts armature plate 38, against the bias of leaf springs 34, into contact with end plate 50. The two friction surfaces 46 and 48 come into contact with one another such that rotor 52 will drive hub 20 through armature plate 38. Magnetic flux path 78 will emanate from coil windings 62 through coil housing 70, through rotor belt engagement portion 58, through the portion of end plate 50 outside of outer banana slot 54 in end plate 50 and into armature plate 38 outside of its outer banana slot 44. Flux path 78 will then wind back and forth between the banana slots in both of the plates and back into rotor hub 64 before completing flux path 78 back at coil windings 62.

As long as flux path 78 is not broken, the magnetic attraction force will keep the two frictional surfaces engaged. If a means of interrupting the flux path, such as placing a high reluctance material along the path, can be had when heat begins to build up due to a clutch slip condition, then the attraction force between the two friction faces can be reduced sufficiently to allow leaf springs 34 to pull armature plate 38 away from end plate 50. Further, stoppers 36 are made to begin melting at a temperature at about the point at which flux path 78 is interrupted, and thereby allow gap 56 to increase to a point where armature plate 38 is spaced too far from end plate 50 for the magnetic attraction to pull them together.

Therefore, flux path 78 only needs to be interrupted sufficiently along its path to allow armature plate 38 to pull away, not along its entire path. This can be as little as one percent of the flux path. Since the object of locating this material is to weaken the clutch during slip conditions to reduce heat generation, the low curie point material may be placed at any place where heat will build up sufficiently to cause an increase in reluctance in order to decrease the attraction between the clutch faces.

End plate portion 50 includes a recessed area 74 along frictional clutch surface 48, extending between the inner radius of end plate 50 and the innermost banana slot 54. Recessed area 74 is filled by affixing a segment of low curie point material 76 into this area. This location is preferred because the magnetic flux density and the temperature tend to be greater at the innermost radius of end plate portion 50.

Preferably, the low curie point material is INVAR produced by Carpenter Steel Technology Corporation in Reading Pa. This is a steel material made mostly from iron with about 30 to 38% nickel, preferably 32 to 36% nickel, and a small percentage of silicon. Thus, rotor 52 is made of low carbon steel except for the inner diameter portion which includes the low curie point material.

Low curie point material segment 76 is strategically placed to increase reluctance of the magnetic clutch circuit and open magnetic flux path 78 when the temperature of the material exceeds the curie point. This temperature is in the range of about 350 to 400 degrees fahrenheit. And, although it is a wear surface, it is on the inner radius of a spinning member and will thereby have a lower linear velocity between the friction surfaces than the wear surface on the outside diameter of the disk. The other diameter of end plate 50 is made from conventional low carbon steel Although segment 76 could also have been placed between any two of the three banana slots 54, this location will best reduce concerns about wear on the clutch face.

In addition to the low curie point material and the meltable stoppers, the clutch protection system also includes a control circuit in a microprocessor 80, shown schematically in FIG. 1, that monitors clutch disengagement. It automatically disengages the clutch by cutting off power source 82 to coil 62 if no disengagement has occurred for set period of time, preferably about 10 minutes.

In operation, if a slip condition occurs, which causes the clutch to overheat, low curie point material segment 76 will increase in reluctance and open the flux path when the predetermined temperature is reached. The clutch may partially disengage and continue to slip at much lower torque levels, if not completely disengaged. In the mean time, stoppers 36 between armature plate 38 and backplate 30 melt. Microprocessor 80 monitors time between disengagements and signals to automatically disengage at least once during each time period. Air gap 56 is now large because stoppers 36 have melted, and the clutch cannot engage again when power is supplied to coil.

FIG. 2 illustrates a first alternate embodiment. This embodiment is the same as the first embodiment except the armature plate configuration is altered somewhat to increase the overall reluctance of flux path 78' at high temperatures. Since most of the elements in the construction shown in FIG. 2 are the same as FIG. 1, similar parts are similarly designated with the addition of a prime.

A layer 86 of low curie point material is affixed to the backside of a reduced thickness armature plate 88. Low curie point material layer 86 is placed on the outside of armature plate 88 so it is not a wear surface, i.e., not part of the clutch face. Three additional sets of banana slots 90 through armature plate 88, but not through layer 86, are located radially aligned with the sets of banana slots 54' in end plate 50'. Then, if a slip condition occurs, the reluctance is increased at multiple points along flux path 78'. Optionally, only one or two additional sets of banana slots can be added rather than all three sets of banana slots 90, if the desire for an increase in reluctance is not as great. Further, layer 86 need not cover the entire backside of armature plate 88, but may be smaller segments strategically located along the backside to align with the additional sets of banana slots 90. An additional advantage of layer 86 on the backside is that heat from normal cycling will be less likely to cause the low curie point material to accidentally exceed its curie point during normal operation, thereby avoiding a false failure. This additional reliability is provided by a design that removes most or all of the low curie point material from direct contact as a friction surface.

FIG. 3 illustrates a second alternate embodiment. In this embodiment, rotor 96 is made entirely of low carbon steel, without any low curie point material. A ring 98 of low curie point material is affixed in a recessed area 100 of the backside of armature plate 102. A set of banana slots 104 are located in armature plate 102 under the low curie material ring 98 to force flux path 78' through the low curie material ring 98. The advantage to this configuration is that low curie point ring 98 is not on a wear surface of the clutch. The low carbon steel material under ring 98 suffices for the friction surface and ring support. Optionally, this configuration can also be combined with the embodiment illustrated in FIG. 1 if more reluctance is desired.

FIG. 4 illustrates a third alternate embodiment of the present invention. This embodiment is essentially the same as the first embodiment, except for the configuration of the meltable stoppers. Armature plate 110 includes spaced holes 112 in its backside. Each of the holes 112 is filled with a meltable rubber or plastic element 114. This is also the type of material that melts away below the curie temperature. Hub 116 includes integral spacers 118, each located to align with a corresponding hole 112. When element 114 melts, spacers 118 sink into holes 112 to cause the air gap to increase dramatically on disengagement of the clutch.

While certain embodiments of the present invention have been described in detail, those familiar with the art to which this invention relates will recognize various alternative designs and embodiments for practicing the invention as defined by the following claims.

I claim:

1. An electromagnetic clutch for use in a vehicle compressor comprising:
    a rotor having an annular end portion made of a magnetic type material and adapted to be mounted rotatably relative to the compressor, the end portion having a first annular friction surface including a portion of the diameter of the annular end portion being made of a low curie point material;
    a hub adapted to be affixed to the drive shaft of the vehicle compressor;
    an armature plate of magnetic type material resiliently connected and biased toward the hub and allowing for limited axial movement toward the annular end portion of the rotor, the armature plate including a second friction surface facing and directly adjacent to the first friction surface forming an air gap in between the two friction surfaces; and a coil assembly mounted within the rotor and comprising means for selectively creating a magnetic field to magnetically attract the armature plate toward the annular end portion of the rotor such that the first and second frictional surfaces engage one another, wherein an increase in temperature of the low curie point portion beyond a predetermined temperature will cause an increase in reluctance of the low curie point material sufficient to reduce the magnetic attractive force between the rotor and the armature plate and thereby disengage the first and second friction surfaces.

2. A clutch according to claim 1 further comprising at least one meltable stopper mounted between the hub and the armature plate wherein an increase in temperature of the stopper to the curie point temperature will melt the meltable stopper, allowing the air gap between the two frictional surfaces to increase when the two frictional surfaces are not engaged.

3. A clutch according to claim 1 wherein the portion of low curie point material is made of INVAR having a nickel content between 30 and 38 percent.

4. A clutch according to claim 1 wherein the annular end portion of the rotor is provided with a plurality of sets of banana slots therethrough being filled with a high magnetic reluctance material, and the armature plate is provided with a plurality of sets of banana slots therethrough being filled with a high magnetic reluctance material.

5. A clutch according to claim 4 wherein the high reluctance material filling the banana slots is a high reluctance material selected from the group consisting of air, stainless steel and plastic.

6. A clutch according to claim 1 wherein the armature plate includes a portion made of a low curie point material.

7. A clutch according to claim 6 wherein the portion of the armature plate made of low curie point material does not form any part of the second friction surface.

8. A clutch according to claim 6 wherein the armature plate includes a backside opposite from the second friction surface and the portion of the armature plate made of low curie point material forms this backside.

9. A clutch according to claim 6 wherein the annular end portion of the rotor is provided with a plurality of sets of banana slots therethrough being filled with a high magnetic reluctance material, and the armature plate is provided with a plurality of sets of banana slots therethrough being filled with a high magnetic reluctance material, and the armature plate further includes a set of partial banana slots corresponding in location and aligned with but not continuously through the portion of the armature plate made of low curie material and aligned with a set of banana slots in the end portion.

10. A clutch according to claim 9 further comprising at least one meltable stopper mounted between the hub and the armature plate wherein an increase in temperature of the stopper to the curie point temperature will melt the meltable stopper, allowing the air gap between the two frictional surfaces to increase when the two frictional surfaces are not engaged.

11. A clutch according to claim 1 further comprising means for disengaging the first and second frictional surfaces after a predetermined time of continuous engagement.

12. A compressor for compressing refrigerant in a motor vehicle air conditioning system comprising:

a compressor housing including a bearing support sleeve;

a bearing assembly mounted to the bearing support sleeve;

a rotor made of a magnetic type material having a rotor hub portion mounted to the bearing assembly, a pulley portion and an annular end portion having a first annular friction surface;

a compressor driveshaft;

a hub affixed to the compressor driveshaft;

an armature plate of magnetic type material resiliently connected and biased toward the hub and allowing for limited axial movement toward the annular end portion of the rotor, the armature plate including a second friction surface facing and directly adjacent to the first friction surface forming an air gap in between the two friction surfaces, the armature plate further including a portion, being less than all of the armature plate, made of a low curie point material; and a coil assembly carried by the housing between the rotor hub portion and the pulley portion and having means for selectively creating a magnetic field to magnetically attract the armature plate toward the annular end portion of the rotor such that the first and second frictional surfaces engage one another wherein an increase in temperature of the low curie point portion beyond a predetermined temperature will cause an increase in reluctance of the low curie point material sufficient to reduce the magnetic attractive force between the rotor and the armature plate and thereby disengage the first and second friction surfaces.

13. A compressor according to claim 12 further comprising means for disengaging the first and second frictional surfaces after a predetermined time of continuous engagement.

14. A compressor according to claim 12 further comprising at least one meltable stopper mounted between the hub and the armature plate wherein an increase in temperature of the stopper to the curie point temperature will melt the meltable stopper, allowing the air gap between the two frictional surfaces to increase when the two frictional surfaces are not engaged.

15. A compressor according to claim 12 wherein the annular end portion of the rotor is provided with a plurality of sets of banana slots therethrough being filled with a high magnetic reluctance material, and the armature plate is provided with a plurality of sets of banana slots therethrough being filled with a high magnetic reluctance material, and the armature plate further includes a set of partial banana slots corresponding in location and aligned with but not continuously through the portion of the armature plate made of low curie material and aligned with a set of banana slots in the end portion.

16. A compressor according to claim 12 wherein the annular end portion of the rotor includes a portion made of a low curie point material.

* * * * *